Jan. 29, 1963 R. PHENEGER 3,075,598
POWER TRANSFER DEVICE
Filed Nov. 18, 1959 6 Sheets-Sheet 1
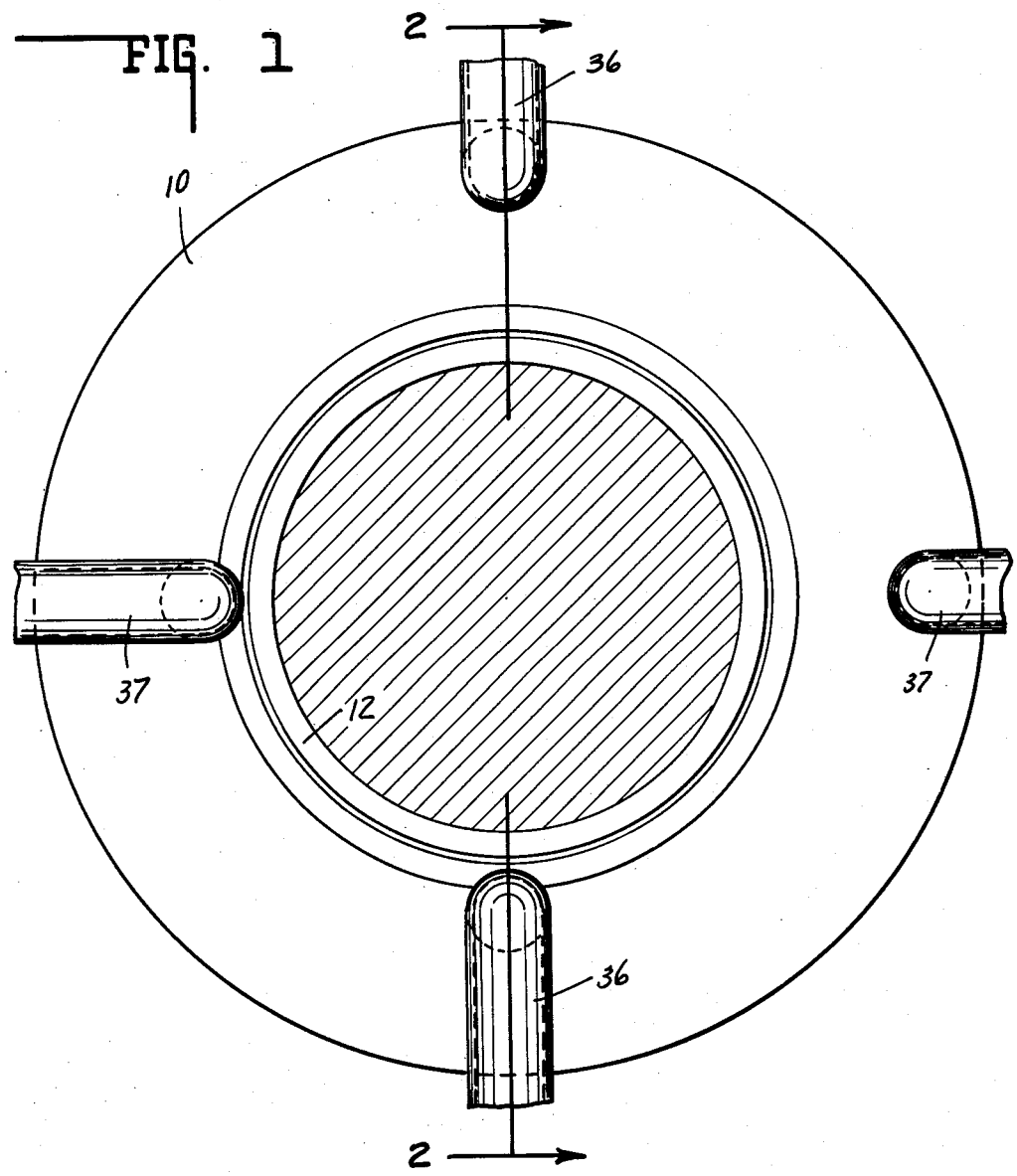
INVENTOR.
ROSCOE PHENEGER.
BY
Lockwood, Woodard, Smith & Weikart.
ATTORNEYS.

Jan. 29, 1963  R. PHENEGER  3,075,598
POWER TRANSFER DEVICE
Filed Nov. 18, 1959  6 Sheets-Sheet 2
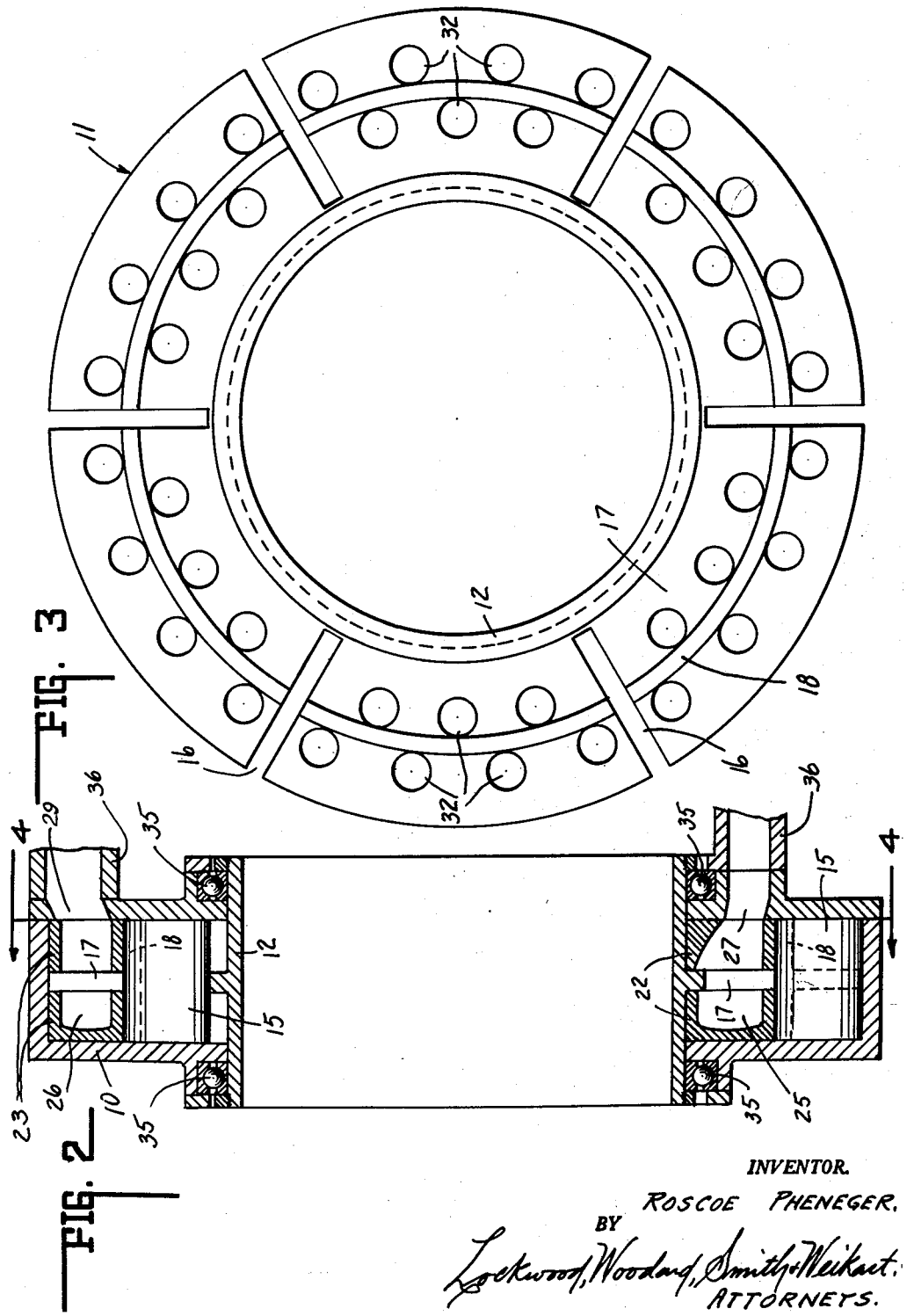
INVENTOR.
ROSCOE PHENEGER.
BY
Lockwood, Woodard, Smith & Weikart.
ATTORNEYS.

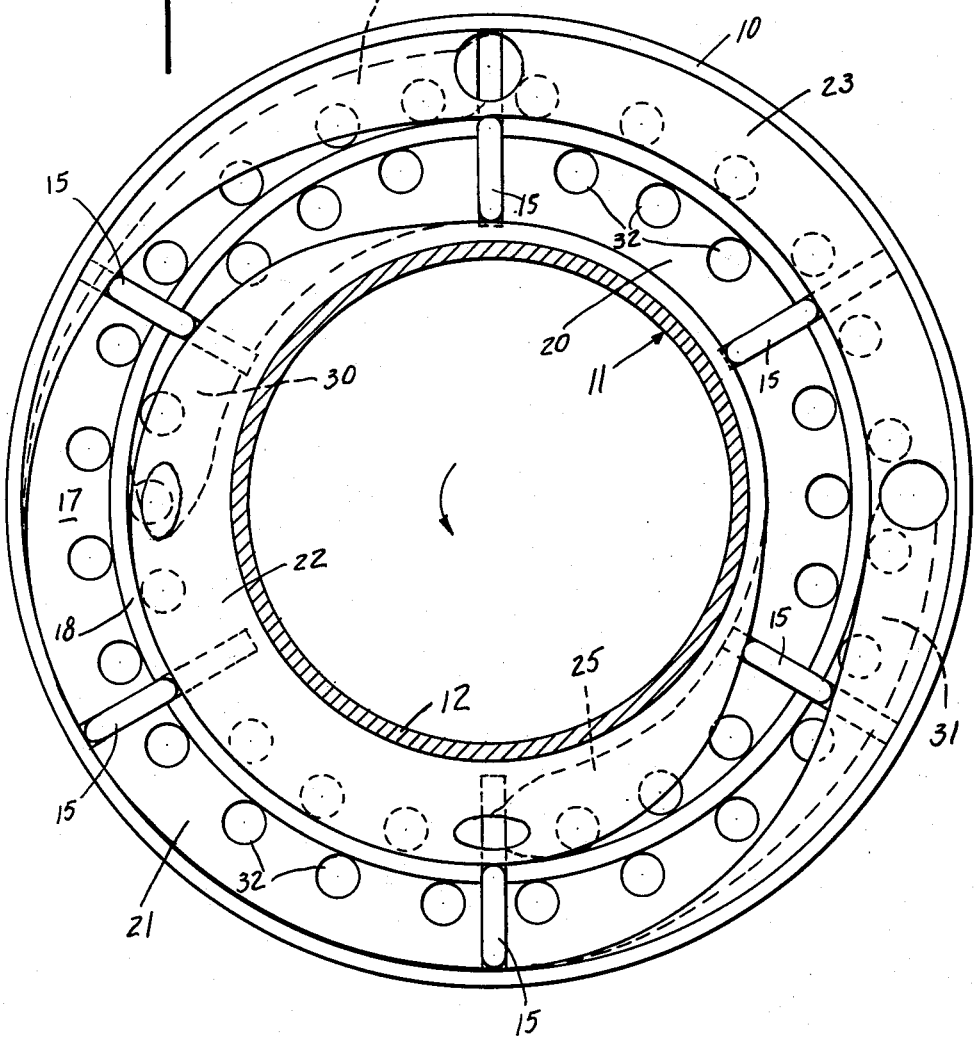

Jan. 29, 1963  R. PHENEGER  3,075,598
POWER TRANSFER DEVICE
Filed Nov. 18, 1959  6 Sheets-Sheet 5

INVENTOR.
ROSCOE PHENEGER.
BY
Lockwood, Woodard, Smith & Weikart
ATTORNEYS.

INVENTOR.
ROSCOE PHENEGER

United States Patent Office 3,075,598
Patented Jan. 29, 1963

3,075,598
POWER TRANSFER DEVICE
Roscoe Pheneger, Fairmount, Ind.
(R.R. 4, Box 260, Elkhart, Ind.)
Filed Nov. 18, 1959, Ser. No. 853,760
7 Claims. (Cl. 180—6.3)

The present invention relates to a power transfer apparatus for an automobile and to a subcombination of the power transfer apparatus, namely, a power transfer device for converting mechanical power to fluid power and for converting fluid power to mechanical power.

A well known problem in the automotive field is the transmitting of power from the engine to the wheels. This transmission must be accomplished smoothly and with minimum friction. Various types of apparatus for accomplishing such transmission have been conceived and put into practice over the years, yet each has become obsolete frequently because of inefficiency and lack of smoothness.

It is, therefore, a primary object of the present invention to provide an improved apparatus for transmitting power from the engine to the wheels of an automobile.

A further object of the present invention is to provide a power transfer apparatus for an automobile which will eliminate the conventional hump in the floor adjacent the rear seat of the automobile and yet will allow the engine of the automobile to remain in its conventional position in the forward portion of the automobile.

Still another object of the present invention is to provide a power transfer apparatus for an automobile which will cause the automobile to better negotiate a turn, the automobile wheels which are away from the axis of the turn being driven with more force than the wheels toward the axis of the turn.

A further object of the present invention is to provide an improved power transfer device for converting mechanical power to fluid power and for converting fluid power to mechanical power.

Still another object of the present invention is to provide a power transfer device incorporating flexibility of action and efficiency of operation in a relatively light weight unit.

Other objects and advantages will appear as the description proceeds.

The full nature of the invention will be understood from the accompanying drawings and the following description and claims.

FIG. 1 is a front elevation of a power transfer device embodying the present invention.

FIG. 2 is a section taken along line 2—2 of FIG. 1 in the direction of the arrows.

FIG. 3 is a front elevation of an annular element forming a portion of the power transfer device illustrated in FIG. 1.

FIG. 4 is a section taken along line 4—4 of FIG. 2 in the direction of the arrows.

Figure 5:
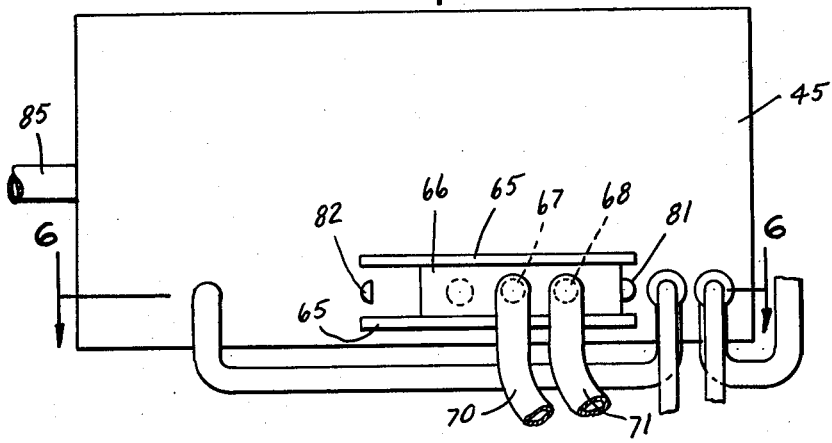
FIG. 5 is a side elevation of a power transfer apparatus for an automobile as embodied in the present invention.
Figure 6:
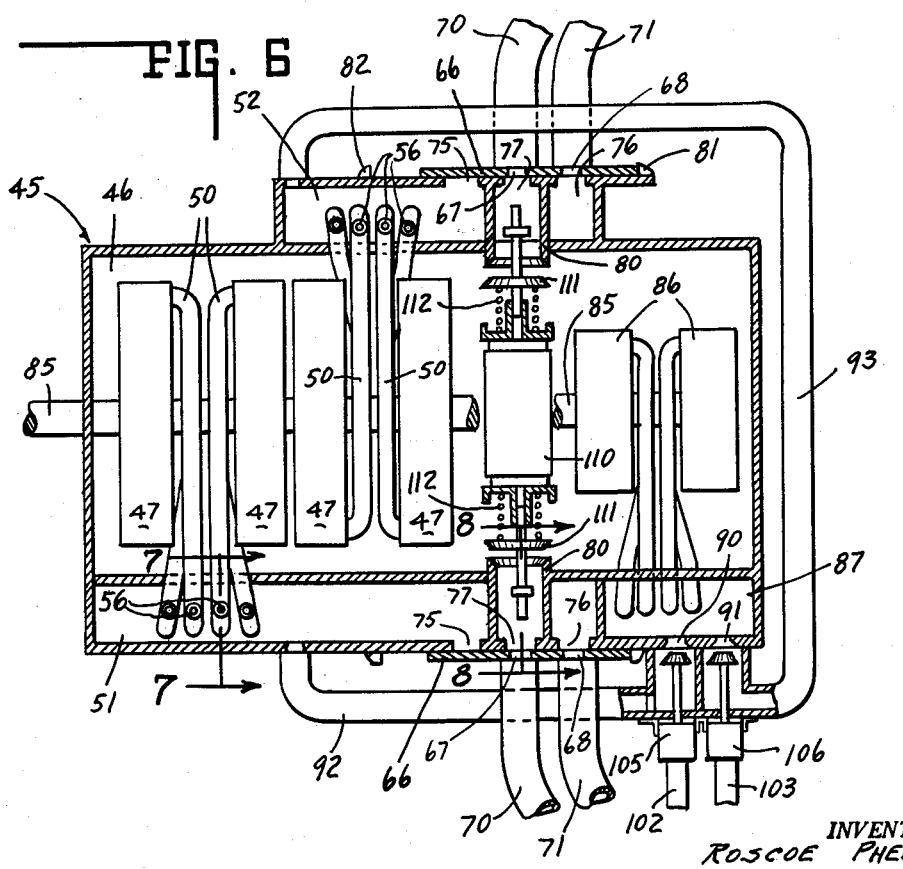
FIG. 6 is a horizontal section taken along line 6—6 of FIG. 5, in the direction of the arrows, certain portions of the structure being shown in elevation rather than as a sectional view.
Figure 7:
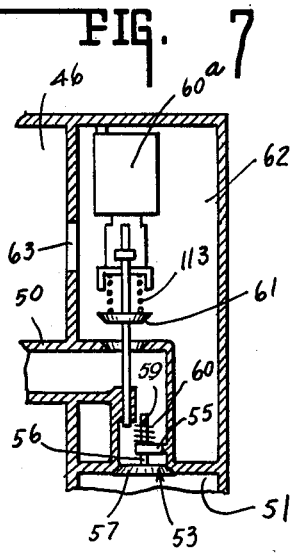
FIG. 7 is a fragmentary vertical section taken along line 7—7 of FIG. 6 in the direction of the arrows.
Figure 8:
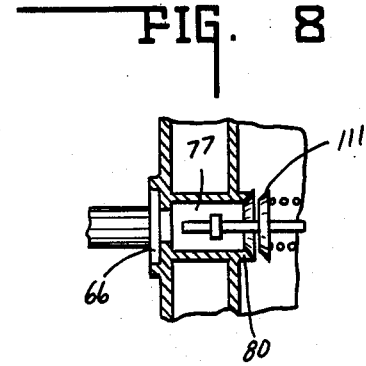
FIG. 8 is a fragmentary vertical section taken along line 8—8 of FIG. 6 in the direction of the arrows.

Referring now to the drawings and more particularly to FIGS. 1–4, the power transfer device of the present invention comprises an annular housing 10 having rotatably mounted therein an annular element indicated generally by the numeral 11 and shown with other parts removed therefrom in FIG. 3. As can be seen in FIG. 2, the annular housing 10 has a generally U-shaped cross section within which the major portion of the annular element is received. In order to make possible assembly of the device, the housing 10 may be constructed in two or more parts which are attached together during assembly.

The annular element 11 has a cylindrical portion 12 positioned radially inwardly of the housing 10, the portion 12 being adapted for attachment to a shaft to be driven or a shaft for providing mechanical rotation to the annular element 11. Thus, the device illustrated in FIGS. 1–4 may operate either as a motor or as a pump. The device operates as a motor when fluid under pressure is supplied to the device and the annular element 11 is rotated, causing a shaft secured to the portion 12 to be rotated. The device operates as a pump when the annular element 11 is rotated by a shaft connected to the portion 12 and fluid, under pressure, is supplied from the device.

A plurality of pistons or vanes 15 are mounted for radial reciprocation within a plurality of radially extending slots 16 equally spaced around the annular element 11. As can be seen from FIG. 3, the annular element 11 has a radially extending portion 17 and a centrally located ring or cylindrical portion 18 which divides the interior of the housing 10 into an inner chamber 20 and an outer chamber 21. A cam 22, which is formed in two parts because of the radially extending portion 17 and a cam 23, which is also formed in two parts for the same reason, are fixed to the housing 10. The cams 22 and 23 extend into the inner chamber 20 and the outer chamber 21, respectively.

Each of the cams is so formed that it extends approximately 270° around the interior of the housing. Each of the cams may be shaped as "a high speed cam." In other words, each cam is so formed that by dividing its initial 90 degrees into eight equal parts, each part (from the beginning of the cam to the 90° point) extends the following ratios of distances into its respective chamber 20 or 21: 1/32, 4/32, 9/32, 16/32, 23/32, 28/32, 31/32, 32/32. The final 90 degrees of the cam recedes out of the respective chambers in the same manner.

Thus, the cams are so formed that they provide complementary arcuate shapes which define a generally circular, eccentrically located path for the vanes, the path passing first through one of the chambers 20 and 21 and then through the other of the chambers during a complete rotation. Each of the cams has formed therein an inlet passage 25 and 26 which communicates between bores 27 and 29 in the walls of the housing 10 and the chambers 20 and 21 respectively. Assuming that the device is operating as a fluid motor, it can be seen that each of the passages 25 and 26 opens into its respective chamber in such a manner that fluid flowing into the chamber from the passage will impinge directly upon the vanes 15.

Each of the cams is also provided with an outlet passage 30 and 31 which communicates between suitable bores (not shown) in the walls of the housing and the chambers 20 and 21, respectively. Assuming for the moment that the device is being used as a pump, it can be seen that fluid being pumped into the passages 30 and 31 will be driven directly therein by means of the vanes 15. Suitable apertures 32 are provided completely around the radially extending portion 17 of the annular element 11 and on both sides of the dividing ring 18 so as to allow hydraulic fluid to pass freely from one side of the device to the other and from one portion of passages 25, 26, 30 and 31 to the other.

In operation, the housing 10 is fixed in position and the annular member 11 rotates within the housing. Suitable bearings 35 are provided between the housing 10 and the cylindrical portion 12 of the annular element in order to insure a friction free rotation of the annular element with respect to the housing. Inlet conduits 36 are secured to the housing so as to communicate with the bores 27 and 29, and outlet conduits 37 are secured to the housing so as to communicate with the outlet bores in the housing. If the device is acting as a pump, a shaft is fixed to the cylindrical portion 12 and is rotated causing fluid to be pumped through the device from the inlet conduits 36 to the outlet conduits 37. If the device is acting as a motor, fluid under pressure is directed into the device through inlet conduits 36 causing the annular member 11 to be rotated and to rotate a shaft fixed to the cylindrical portion 12.

Figure 10:
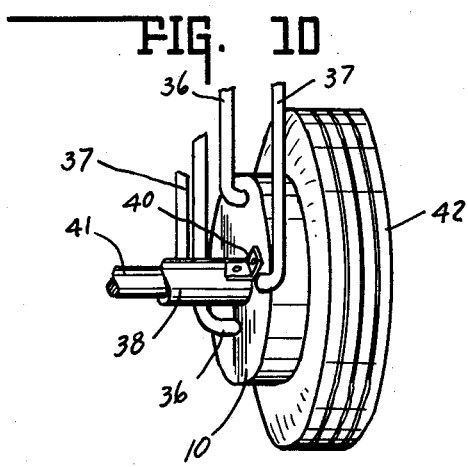
FIG. 10 is a fragmentary perspective view of a representative one of the wheels of an automobile having the power transfer apparatus of the present invention incorporated therein.
Figure 11:
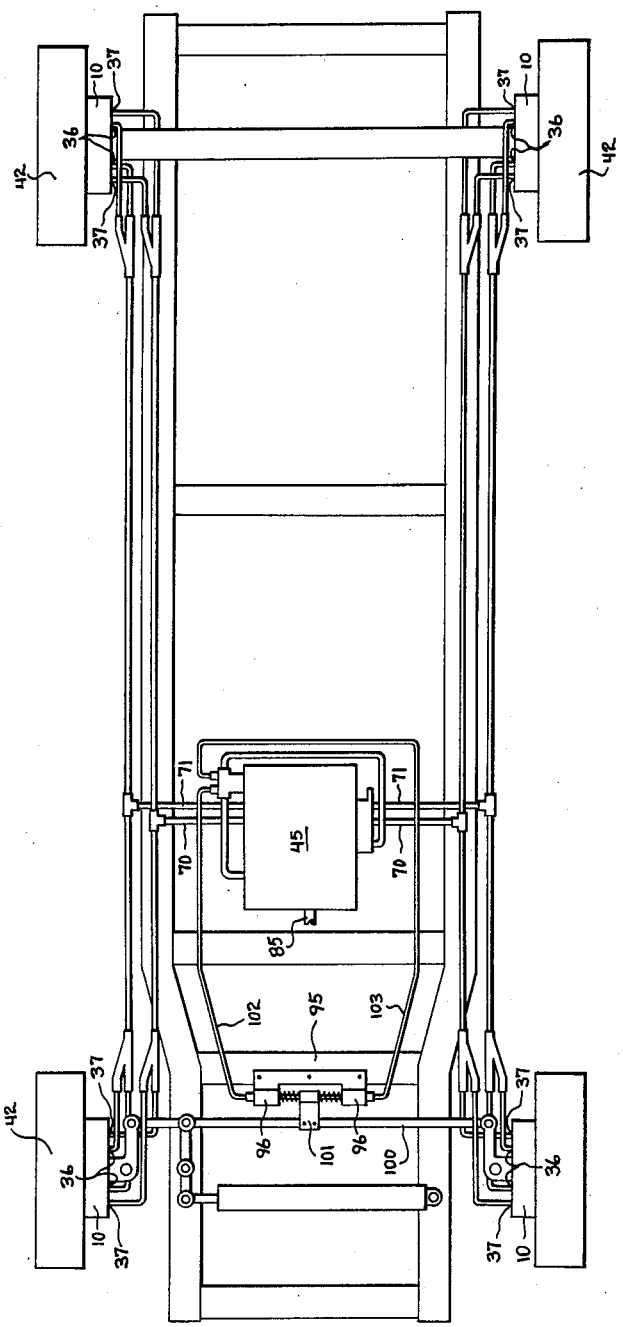
FIG. 11 is a schematic bottom plan view of a complete automobile incorporating the power transfer apparatus of the present invention.

The power transfer device of the present invention may be incorporated within an automobile in order to transmit the power of the engine to the wheels. In such an arrangement, four of the devices as above described would be located at the wheels of the automobile, a representative one of the wheels of the automobile being illustrated in FIG. 10. The outer casing 38 of the rear axle is fixed to the housing 10 of the device by suitable brackets 40. The rear axle 41 which is rotatably mounted within the casing 38 is fixed to the cylindrical portion 12 of the annular element 11 and is also fixed with relation to the wheel 42 of the automobile. Thus, when fluid is pumped into the inlet conduits 36, the annular element 11 is caused to rotate and the wheel 42 is caused to rotate.

The installation of the power transfer device of the present invention upon the front wheels of the automobile would be accomplished in a similar manner. If desired, the automobile may be provided with only two of the power transfer devices which could be located at either the front or the rear wheels.

Referring now to FIGS. 5–9, there is illustrated a power transfer apparatus for an automobile which includes a container 45 having a relatively large chamber 46 therein within which are mounted a plurality of power transfer devices 47 as above described, the devices being mounted in such a manner that their outer casings are fixed with relation to the container 45. The outlet conduits 50 of the devices 47 lead into pressure chambers 51 and 52 located on the opposite sides of the container 45. Located within each of the conduits 50 is a check valve 53 (FIG. 7) which prevents the flow of hydraulic fluid from the pressure chamber 51 or 52 into the respective conduit 50.

The check valves 53 are mounted within the opening of the respective conduits into the pressure chamber by means of apertured projections 55 fixed within the conduits and having reciprocably mounted therein stems 56 fixed to valve closure elements 57. The check valves 53 are maintained in a closed position by means of compression springs 60 received between the projections 55 and pins 59 fixed to and extending from the stems 56. Thus, the conduits 50 will not be opened to allow hydraulic fluid to pass into the pressure chambers 51 and 52 until the pressure within a respective conduit 50 is a predetermined amount greater than the pressure within the pressure chamber.

Each of the conduits 50 has associated therewith a hydraulic valve 60a having a closure member 61. Above each of the pressure chambers 51 and 52, there is provided a further chamber 62 which communicates by means of bore 63 between the conduits 50 and the relatively large chamber 46 within the container 45. When a respective one of the closure members 61 is opened by its valve 60a, fluid under pressure is allowed to flow from the particular conduit 50 through one of the chambers 62 into the chamber 46.

In the particular embodiment illustrated, the various power transfer devices 47 do not have inlet conduits such as the above described conduits 36 but rather open directly into the chamber 46. Thus, when a particular valve 60a is open, the fluid under pressure passing through the chamber 62 will merely enter the inlet ports of the various devices and will be pumped through the various devices to their outlet conduits 50.

The purpose of the various valves 60a is to allow the driver of the automobile to vary the amount of power delivered from the engine to the power transfer devices at the wheels. If the operator desires that the car move slowly, he will close only a pair or possibly four of the valves 60a. If he desires that the automobile move rapidly, he will close all of the valves 60a so that all of the fluid being pumped by the devices 47 would be delivered to the pressure chambers 51 and 52.

Reciprocably mounted between tracks 65 on both sides of the container 45 are a pair of plates 66. Each of the plates 66 has a pair of bores 67 and 68 therethrough which communicate with conduits 70 and 71, respectively. The conduits 71 and 70 communicate with the inlet conduits 36 and the outlet conduits 37, respectively, at the wheels of the automobile, the conduit 71 on one side of the automobile being arranged to communicate with the inlet conduit on that side of the automobile and the conduit 70 on one side of the automobile being arranged to communicate with the outlet conduits on that side of the automobile. The container 45 has two bores 75 and 76 on each side thereof which open into the pressure chambers 51 and 52. When the plates 66 are in the position illustrated in FIGS. 5 and 6, the conduits 71 communicate with the pressure chambers 51 and 52 through the bores 76. The container 45 has a further bore 77 on each side thereof which communicates with the interior chamber 46 through suitable conduits 80. Thus, when the plates 66 are in the position of FIGS. 5 and 6, fluid flowing through the conduit 70 from the wheels will be transmitted into the chamber 46.

The plates 66 may be moved from the position illustrated wherein the plates 66 abut the stops 81 to a position wherein the plates 66 abut the stops 82. In this position, the conduits 70 communicate with the pressure chambers 51 and 52 through the bores 75 and the conduits 71 communicate with the chamber 46 through the bores 77 and the conduits 80. It can be seen that such repositioning of the plates 66 will reverse the hydraulic flow being delivered to the power transfer devices at the wheels and thus will reverse the direction of movement of the automobile. Suitable means (not shown), hydraulic or otherwise, may be provided for moving the plates 66 between their two positions.

A shaft 85 is rotatably mounted upon the container 45 and extends through each of the power transfer devices 47 and through a further pair of power transfer devices 86. The shaft 85 is operatively connected to the engine of the automobile for driving thereby and is fixed to the inner cylindrical portion similar to the portion 12, above described, of each of the power transfer devices 47 and 86. Thus, the driving of the shaft 85 by the engine causes each of the power transfer devices to operate as a pump.

One function of the additional power transfer devices 86 is to act as an overdrive. Each of these additional devices is provided with a check valve (not shown) similar to the check valve 53 and with a valve (not shown) similar to the valve 60a. A pressure chamber 87 is provided for receiving the output of the devices 86 and an additional pressure chamber (not shown) similar to the pressure chamber 62 is provided for bypassing the output of the devices 86 back to the interior chamber 46.

Thus, the power transfer devices 86 may be cut in if desired by closing their valves similar to the valves 60a and providing hydraulic fluid under pressure to the pressure chamber 87. This pressurized fluid passes through bores 90 and 91 into conduits 92 and 93 which lead into the pressure chambers 51 and 52. This additional hydraulic fluid under pressure then is used to drive the automobile in the manner above described in regard to the power transfer devices 47.

A second function of the power transfer devices 86 is to provide means for enabling the automobile to better negotiate a turn. The well known differential in a conventional automobile operates only to equalize the force delivered by the two rear wheels of the automobile. The present invention is an improvement upon this arrangement in that the present invention provides an extra amount of force to the automobile wheels which are away from the axis of the turn. This effect is accomplished by directing the output of the power transfer devices 86 to the automobile wheels which are away from the axis of the turn.

Figure 9:
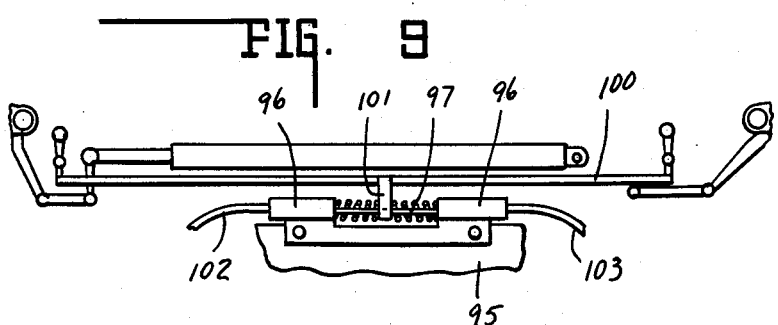
FIG. 9 is a fragmentary plan view of the steering apparatus of an automobile having the power transfer apparatus of the present invention incorporated therein.

Referring to FIG. 9, the forward portion 95 of the frame of the automobile has mounted thereon a pair of hydraulic cylinders 96. The pistons of the cylinders 96 are fixed to a shaft 97 which in turn is fixed with relation to the tie rod 100 of the automobile by means of a connecting member 101. When the automobile is turned in one direction or another, the tie rod 100 is moved leftwardly or rightwardly causing the hydraulic pressure in one of the lines 102 and 103 to be increased and causing the hydraulic pressure in the other of these lines to be decreased.

The lines 102 and 103 are connected respectively to valves 105 and 106 mounted in the sidewall of the container 45 and controlling the fluid flow from the pressure chamber 87 into the conduits 92 and 93, respectively. The apparatus is so arranged that when the automobile negotiates a turn, an extra amount of hydraulic fluid under pressure will be delivered to the power transfer device at the outside wheels through either the pressure chamber 51 or the pressure chamber 52. For example, if the wheels associated with the pressure chamber 51 are away from the axis of the turn, the valve 105 will be opened (either partially or completely depending upon the degree of the turn) and the valve 106 closed (either partially or completely). The valves will be so arranged that the extra fluid flowing to the outside pressure chamber 50 or 51 will drive the outside wheels with more force than the inside wheels.

The brake pedal of the automobile is arranged to operate a hydraulic cylinder 110 having two closure members 111 which function to control fluid flow through the conduits 80. When the hydraulic valve 110 is operated to cause the closure members 111 to engage their respective valve seats, fluid flow from the wheels through the conduits 80 is shut off. Hydraulic pressure will build up within the outlet conduits of the power transfer devices in the wheels and will exceed the inlet pressure to those power transfer devices so as to cause the power transfer devices in the wheels to act as brakes for the automobile. It should be noted that the valve 110 has coiled compression springs 112 arranged to bear against the closure members 111 and to urge them into closing position. These springs function to make the operation of the brake smoother. It should also be noted that each of the valves 60a is provided with a coiled compression spring 113 which is arranged and functions in a similar manner.

From the above description, it can be seen that the present invention provides an improved apparatus for transmitting power from the engine of an automobile to the wheels thereof. It can be seen that by the use of the present invention, the conventional hump in the floor of an automobile can be eliminated. It will be further evident that the present invention provides power transfer apparatus for an automobile which will enable the automobile to better negotiate a turn. It can further be seen that the present invention provides in the respective power transfer device sub-combinations, an improved device for converting mechanical power to fluid power and for converting fluid power to mechanical power.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A power transfer device comprising a housing having an inner cylindrical surface forming an annular chamber therein, an annular element, bearings mounting said annular element concentrically upon said housing for rotation in said housing chamber, a plurality of vanes mounted for radial reciprocation upon said annular element, said annular element having slots therein which receive and mount said vanes, said annular element being formed with a central ring which divides said chamber into two fluid sections, and a pair of cams secured to said housing and extending into respective ones of said sections in such a manner as to guide said vanes through each of said sections each time said annular element moves through one rotation, each of said cams having a single inlet passage therethrough which opens into the respective section associated with the cam, each of said cams having a single outlet passage therethrough which opens into the respective section associated with the cam, said inlet passages being positioned coextensively and within their respective section so that fluid entering said sections from said inlet passages enters directly behind respective ones of the vanes, said outlet passages being positioned coextensively and within their respective section so that fluid leaving said sections to said outlet passages is directly in front of respective ones of said vanes, one of said cams being located inwardly of the other of said cams and having an outer surface which faces an inner surface of the other cam, each of said cams extending through approximately 270 degrees, said outer and inner surfaces being generally part-cylindrical and concentric with their common axis eccentrically spaced from the axis of said annular chamber a distance equal to the radial thickness of one of said fluid sections, a portion of the inner surface of the outer cam engaging the outer peripheral surface of the central ring and a portion of the outer surface of the inner cam engaging the inner peripheral surface of the central ring, each vane riding upon the inner surface of the outer cam and upon the outer surface of the inner cam.

2. A power transfer device comprising an annular housing having an inner cylindrical surface forming an annular chamber therein, an annular element, bearings mounting said annular element concentrically upon said housing for rotation within said housing chamber about the axis thereof, said annular element having a cylindrical portion positioned radially inwardly of said housing for attachment to a rotary drive or driven means, said annular element having a portion extending radially of said housing and positioned centrally of said chamber, said portion having apertures therethrough allowing fluid flow from one side of said chamber to the other, said annular element being formed with an axially extending cylinder arranged centrally of said radially extending portion and dividing said chamber into two fluid sections located radially of one another, a plurality of spaced vanes mounted for radial reciprocation upon said annular element, said annular element having slots therein which receive and mount said vanes, and an inner cam and an outer cam secured to said housing and extending into respective ones of said sections, said cams having complementary arcuate shapes defining a generally circular path for said vanes, said path passing through each of said sections, each of said cams having a single inlet passage of relatively constant size which opens into the respective section associated with the cam, each of said cams having a single outlet passage of relatively constant size which opens into the respective section associated with the cam, said inlet passages being positioned coextensively and within their respective section so that fluid entering said sections from said inlet passages enters directly behind respective ones of the vanes, said outlet passages being positioned coextensively and within their respective section so that fluid leaving said sections to said outlet passages is directly in front of respective ones of said vanes, each of said cams extending through approximately 270 degrees, said cam surfaces being generally part-cylindrical and concentric with their common axis eccentrically spaced from the axis of said housing a distance equal to the radial thickness of one of said fluid sections, a portion of the inner surface of the outer cam engaging the outer peripheral surface of said cylinder and a portion of the outer surface of the inner cam engaging the inner peripheral surface of the cylinder, each vane riding upon the inner surface of the outer cam and upon the outer surface of the inner cam.

3. A power transfer device comprising a housing having an annular cylindrical surface forming an annular chamber therein, an annular element, bearings mounting said annular element upon said housing for concentric rotation in said housing chamber, said annular element being formed to divide said chamber into two fluid sections, a plurality of vanes mounted for radial reciprocation on said annular element, said annular element having slots therein which receive and mount said vanes, and an inner and outer cam secured to said housing and extending into said fluid sections for guiding said vanes through each of said sections each time said annular member moves through one rotation, each of said cams having therethrough an inlet passage and an outlet passage opening into a respective section, said inlet passages and said outlet passages being positioned coextensively with and within the respective sections, said outer cam having an inner surface and said inner cam having an outer surface, said cam surfaces being mutually facing, each of said cams extending through approximately 270 degrees, said cam surfaces being generally part-cylindrical and concentric with their common axis eccentrically spaced from the axis of said chamber a distance equal to the radial thickness of one of said fluid sections, a portion of the inner surface of the outer cam engaging the annular element and a portion of the outer surface of the inner cam engaging the annular element, each vane riding upon the inner surface of the outer cam and upon the outer surface of the inner cam.

4. Power transfer apparatus for an automobile having wheels on both sides thereof and having an engine comprising at least a pair of fluid pumps, a pair of pressure chambers, each of said pumps being connected to a respective one of said pressure chambers for pumping fluid thereto, a further pump, means, operated by the angling of the front wheels to turn the car, for apportioning the output of said further pump between said pressure chambers, a plurality of fluid motors mounted at the wheels of the automobile for the driving thereof, conduits connecting one of said pressure chambers with the fluid motors on one side of the automobile and connecting the other of said pressure chambers with the fluid motors on the other side of the automobile, and means for operatively connecting the engine of the automobile to the fluid pumps for the driving thereof, and means for returning fluid from the motors at the wheels to said pumps.

5. Power transfer apparatus for an automobile having an engine and wheels on both sides thereof comprising a closed container, a pair of devices as defined in claim 1 mounted within said container, said inlet passages communicating with the interior of said closed container, a pair of pressure chambers, half of said outlet passages communicating with one of said pressure chambers and the other half of said outlet passages communicating with the other of said pressure chambers, means for operatively connecting the engine of the automobile to the annular element of each device for the driving thereof, a further plurality of devices as defined in claim 1 mounted at the automobile wheels for the driving thereof, a first set of conduits connecting one of said pressure chambers with the inlet passages of the devices of said further plurality which are on one side of the automobile and connecting the other of said pressure chambers with the inlet passages of the devices of said further plurality which are on the other side of the automobile, a second set of conduits connecting the outlet passages of the devices of said further plurality with the closed container, a pump mounted within said closed container, said engine being connected to and driving said pump, a further pressure chamber, a conduit connecting the outlet of said pump with said further pressure chamber, the inlet of said pump being in communication with the interior of said closed container, a third conduit connecting one of said pair of pressure chambers with said further pressure chamber, a fourth conduit connecting the other of said pair of pressure chambers with said further pressure chamber, a pair of valves received in said third and fourth conduits for controlling fluid flow therethrough, a pair of hydraulic piston cylinders mounted on the forward portion of the automobile, said hydraulic cylinders being operatively connected to respective ones of said valves, said automobile having its steering tie bar connected to the pistons of said hydraulic cylinders in such a manner that as one cylinder is operated to close its valve, the other cylinder is operated to open its valve, said valves being so arranged that the outermost wheels are provided with the most power when the automobile turns.

6. Power transfer apparatus as defined in claim 5 and additionally comprising valves operable by the driver of the car for stopping flow through said second set of conduits for braking the automobile.

7. Power transfer apparatus as defined in claim 5 and additionally comprising means for reversing the connections of said first set of conduits and said second set of conduits for reversing the direction of movement of the automobile.

References Cited in the file of this patent

UNITED STATES PATENTS

| | | |
|---|---|---|
| 612,962 | Bond | Oct. 25, 1898 |
| 1,026,662 | Eisner | May 21, 1912 |
| 1,176,307 | Manly | Mar. 21, 1916 |
| 1,468,889 | Trotter | Sept. 25, 1923 |
| 1,787,565 | Brown | Jan. 6, 1931 |
| 1,803,932 | Dooley | May 5, 1931 |
| 2,076,722 | Heinze | Apr. 13, 1937 |
| 2,228,411 | Sheridan | Jan. 14, 1941 |
| 2,257,108 | Cornwell | Sept. 30, 1941 |
| 2,626,001 | Antle | Jan. 20, 1953 |
| 2,804,016 | Moore | Aug. 27, 1957 |
| 2,827,857 | Eserkaln | Mar. 25, 1958 |
| 2,833,362 | Martin | May 6, 1958 |
| 2,880,677 | Grupen | Apr. 7, 1959 |
| 2,886,944 | Horwood | May 19, 1959 |